United States Patent [19]

Anan et al.

[11] Patent Number: 5,388,046

[45] Date of Patent: Feb. 7, 1995

[54] TRACTION CONTROLLER FOR A VEHICLE

[75] Inventors: Yoshiaki Anan; Tetsuhiro Yamashita, both of Hiroshima, Japan

[73] Assignee: Mazda Motor Corporation, Hiroshima, Japan

[21] Appl. No.: 793,538

[22] Filed: Nov. 18, 1991

[30] Foreign Application Priority Data

Nov. 22, 1990 [JP] Japan ................. 2-318831
Nov. 30, 1990 [JP] Japan ................. 2-340063

[51] Int. Cl.6 ............................. B62D 5/04
[52] U.S. Cl. .................. 364/424.05; 364/424.01;
364/426.03; 180/197; 180/233; 180/142;
180/140; 280/91
[58] Field of Search .............. 364/424.05, 424.03,
364/424.1, 426.03, 426.02, 424.01; 180/233,
188, 140, 138, 197, 248, 142; 280/91

[56] References Cited

U.S. PATENT DOCUMENTS

| | | | |
|---|---|---|---|
| 4,720,790 | 1/1988 | Miki et al. ................. | 364/424 |
| 4,776,424 | 10/1988 | Naito ................. | 180/233 |
| 4,874,056 | 10/1989 | Naito ................. | 180/233 |
| 4,897,776 | 1/1990 | Urababa et al. ................. | 364/424.05 |
| 4,949,261 | 8/1990 | Ito et al. ................. | 364/424.05 |
| 4,953,654 | 9/1990 | Imaseki et al. ................. | 180/197 |
| 4,964,481 | 10/1990 | Sano et al. ................. | 180/140 |
| 4,969,212 | 11/1990 | Walter ................. | 364/424.03 |
| 5,024,285 | 6/1991 | Fujita ................. | 180/197 |
| 5,099,940 | 3/1992 | Imaseki et al. ................. | 180/140 |
| 5,103,925 | 4/1992 | Imaseki et al. ................. | 180/140 |
| 5,116,254 | 5/1992 | Sano et al. ................. | 180/140 |

FOREIGN PATENT DOCUMENTS

| | | |
|---|---|---|
| 0315352 | 5/1989 | European Pat. Off. . |
| 0338538 | 10/1989 | European Pat. Off. . |
| 0439191 | 7/1991 | European Pat. Off. . |
| 63-66703 | 7/1981 | Japan . |

*Primary Examiner*—Kevin J. Teska
*Assistant Examiner*—Jacques Harold Louis-Jacques
*Attorney, Agent, or Firm*—Sixbey, Friedman, Leedom & Ferguson

[57] ABSTRACT

A traction controller for a vehicle having a control system for controlling the driving of driving wheels such that the spin quantities of the driving wheels from a road surface become target spin quantities, a mechanism for correcting a control condition based on the lateral acceleration of the vehicle, calculating the actual turning radius Rr of the vehicle, and calculating the steering angle corresponding turning radius Ri of the vehicle. When a tendency for the vehicle to deviate from a running line having the turning radius Ri is marked at the time of turning, the lateral acceleration of the vehicle is calculated based on the turning radius Ri. Consequently, it is possible to prevent the excessive under-steer state of the vehicle.

25 Claims, 9 Drawing Sheets

TRACTION CONTROLLER FOR A VEHICLE

BACKGROUND OF THE INVENTION

The present invention relates to a traction controller for a vehicle.

In general, there has been known traction control in which engine outputs and/or the application of braking force to a wheel are controlled (the engine outputs are lowered or the braking force is increased) such that the spin value of a driving wheel to be detected can become a target one in order to prevent the driving wheel from extreme spinning by an excessive driving torque, so as to enhance an acceleratability.

There has been known the proposal in which a G sensor for detecting the lateral acceleration of the vehicle is provided in an antiskid brake controller so as to correct the braking target value of the speed or deceleration of right and left wheels according to the lateral acceleration (see Japanese Examined Patent Publication Gazette No. 63-66703).

In the case where the vehicle is to be turned, the driving wheels can easily spin. Under the circumstances, the lateral acceleration is generated on the vehicle. In the vehicle having a traction controller, it is desired that when the lateral acceleration is greater, traction (spin) control is started earlier or a control quantity is increased. Consequently, it is possible to prevent a great spin from being caused.

However, it is necessary to provide the G sensor in order to detect the lateral acceleration.

In general, there has been known that the lateral acceleration can be calculated based on a vehicle speed and a vehicle turning radius. Accordingly, it is supposed that the lateral acceleration is obtained by calculation instead of using the G sensor. However, if the lateral acceleration is detected based on the actual turning radius of the vehicle so as to correct the traction control, there cannot necessarily be carried out the traction control suitable for the state of the vehicle.

By way of example, when the vehicle speed is high, a handle steering angle is great or a road friction coefficient is low at the time of turning, the actual turning line of the vehicle can easily deviate from a line intended by a driver, i.e., an under-steering (hereinafter referred to as under-steer) tendency becomes marked. In this case, it is sufficient that the traction control is started earlier or the control quantity is increased. However, when there is an under-steer tendency, the actual turning radius of the vehicle is increased so that the lateral acceleration obtained by the calculation is made smaller. Consequently, it is impossible to necessarily start the traction control early and increase the control quantity by request.

SUMMARY OF THE INVENTION

It is an object of the present invention to calculate the lateral acceleration of a vehicle so as to correct traction control without using a G sensor.

It is another object of the present invention to cause traction control correction to be automatically suitable for the state of the vehicle, in particular, to prevent the vehicle from showing an excessive under-steer tendency.

To achieve the above-mentioned objects, the present invention provides that the actual turning radius of the vehicle and a steering angle corresponding turning radius are properly used according to a tendency for the actual running line of the vehicle to deviate from a turning line intended by a driver in the case where the lateral acceleration of the vehicle is calculated so as to correct the traction control.

To solve the above-mentioned problems, the present invention provides as first means a traction controller for a vehicle comprising;
control means for controlling the driving of driving wheels such that the spin quantities of the driving wheels from a road surface become target ones when they exceed predetermined thresholds,
vehicle speed detecting means for detecting a vehicle speed,
driven wheel speed detecting means for detecting right and left driven wheel speeds,
steering angle detecting means for detecting a steering angle,
actual turning radius calculating means for calculating the actual turning radius Rr of the vehicle based on the difference between the right and left driven wheel speeds detected by the driven wheel speed detecting means,
steering angle corresponding turning radius calculating means for calculating the turning radius Ri of the vehicle based on the steering angle detected by the steering angle detecting means,
lateral acceleration calculating means for calculating the lateral acceleration of the. vehicle based on the vehicle speed detected by the vehicle speed detecting means and one of the actual turning radius Rr calculated by the actual turning radius calculating means and the steering angle corresponding turning radius Ri calculated by the steering angle corresponding turning radius calculating means,
correcting means for correcting the control condition of the control means based on the lateral acceleration calculated by the lateral acceleration calculating means, and
turning radius selecting means for judging a tendency for the vehicle to deviate from a running line having the steering angle corresponding turning radius Ri at the time of turning based on at least one of the road surface condition and the driving conditions of the vehicle so as to select as a turning radius for lateral acceleration calculation by the lateral acceleration calculating means the steering angle corresponding turning radius Ri when the tendency is marked, and the actual turning radius Rr when the tendency is not marked.

In the traction controller, when there is a marked tendency for the vehicle to deviate from the running line having the steering angle corresponding turning radius Ri, i.e., an under-steer tendency is marked at the time of turning, the lateral acceleration of the vehicle is calculated by using the steering angle corresponding turning radius Ri. In this case, the steering angle corresponding turning radius Ri is smaller than the actual turning radius Rr, so that the lateral acceleration is made greater. Consequently, the control condition of the traction control is corrected so as to be suitable for the great lateral acceleration.

By way of example, the correction contents of the control condition are set such that a traction control starting threshold is decreased as the lateral acceleration is increased. Consequently, when the under-steer tendency is marked, the traction control is started at a time when the spin quantity is small, i.e., earlier. As a result, the driving torque of the driving wheel is lowered earlier, so that the under-steer tendency can be suppressed by utilizing the decelerating operation of the vehicle and the under-steer characteristic which is preliminarily possessed by the vehicle (when the vehicle speed is lower, the turning radius is made smaller). In case of a front drive vehicle, particularly, a moment around the center of gravity of the vehicle, which is caused by quickly changing the direction of the forward force of front wheels, is changed and the cornering force decreased by driving force is recovered, so that the under-steer tendency can be eliminated positively and rapidly.

If the correction contents of the control condition are set such that a target spin quantity is made smaller as the lateral acceleration is increased, the lateral acceleration obtained by selecting the steering angle corresponding turning radius Ri is increased when the under-steer tendency is marked. Consequently, the target spin quantity is made smaller than that of the case where the actual turning radius Rr is selected. As a result, even if the actual spin quantity is the same, the target spin quantity is small so that a control quantity (the lowering quantity of the driving torque) is increased. Consequently, the under-steer tendency can be eliminated positively and rapidly in similar to the case where the control is early started.

According to the present invention, therefore, it is possible to prevent the vehicle from showing the excessive under-steer tendency. Consequently, the turning line of the vehicle can be caused to approach the line intended by the driver without excessive handling.

When there is not marked the tendency for the vehicle to deviate from the running line having the steering angle corresponding turning radius Ri at the time of turning, a demand for the early start of the traction control or an increase in control quantity is comparatively poor. Consequently, the lateral acceleration is calculated by using the actual turning radius Rr. The traction control is corrected by an almost precise lateral acceleration based on the actual turning radius Rr, so that a great wheel spin can be prevented from being caused.

Preferred turning radius selecting means selects the steering angle corresponding turning radius Ri when the absolute value of the steering angle detected by the steering angle detecting means is equal to or greater than a predetermined value, and selects the actual turning radius Rr when the absolute value is smaller than the predetermined value.

Another preferred turning radius selecting means selects the steering angle corresponding turning radius Ri when the vehicle speed detected by the vehicle speed detecting means is equal to or greater than a predetermined value, and selects the actual turning radius Rr when the vehicle speed is smaller than the predetermined speed value.

Referring to yet another preferred turning radius selecting means, the traction controller comprises road friction coefficient detecting means for detecting a friction coefficient $\mu$ between a wheel tire and a road surface, the steering angle corresponding turning radius Ri is selected when the friction coefficient $\mu$ detected by the road friction coefficient detecting means is equal to or smaller than a predetermined value, and the actual turning radius Rr is selected when the friction coefficient $\mu$ is greater than the predetermined $\mu$ value.

When the steering angle is great, the vehicle speed is high or the road friction coefficient $\mu$ is small, there is marked the tendency for the vehicle to deviate from the running line having the steering angle corresponding turning radius Ri.

Further preferred turning radius selecting means selects the steering angle corresponding turning radius Ri when the absolute value of the steering angle detected by the steering angle detecting means is equal to or greater than a predetermined value, the vehicle speed detected by the vehicle speed detecting means is equal to or greater than a predetermined value and the friction coefficient $\mu$ detected by the road friction coefficient detecting means is equal to or smaller than a predetermined value, and selects the actual turning radius Rr when one of them is not met. Thus, if a plurality of conditions are to be met in order to select the steering angle corresponding turning radius Ri, it is possible to prevent the traction control from being started unnecessarily early or to prevent the control quantity from being unnecessarily increased when the vehicle temporarily shows the marked under-steer tendency (the under-steer tendency is immediately eliminated). More specifically, when there is a high probability that the vehicle shows the excessive under-steer tendency, there can be performed the early start and the increase in control quantity.

It is desired that the road friction coefficient detecting means calculates a road friction coefficient $\mu$ in accordance with a preset and stored $\mu$ table based on a vehicle speed Vr detected by the vehicle speed detecting means and the acceleration VG of the vehicle speed Vr, the $\mu$ table being set such that the road friction coefficient $\mu$ is increased as the vehicle speed Vr is increased and the acceleration VG is increased.

It is preferred that the vehicle speed detecting means detects as a vehicle speed either of the right and left driven wheel speeds, which is higher, detected by the driven wheel speed detecting means.

Referring to preferred correcting means, a control condition to be corrected by the correcting means is a traction control starting threshold, the correcting means correcting the starting threshold such that traction control is started with the smaller spin quantity as the lateral acceleration calculated by the lateral acceleration calculating means is increased.

Referring to another preferred correcting means, a control condition to be corrected by the correcting means is a target spin quantity, the correcting means correcting the target spin quantity such that it is decreased as the lateral acceleration calculated by the lateral acceleration calculating means is increased.

Referring to a preferred mode of the present invention, the traction controller further comprises control start promoting means for starting the traction control with the smaller spin quantity when the actual turning radius Rr is greater than the steering angle corresponding turning radius Ri.

In that case, the control start promoting means forcibly starts the traction control.

More specifically, when the actual turning radius Rr is greater than the steering angle corresponding turning radius Ri, the vehicle actually begins to show the marked under-steer tendency. At this time, the traction control is rapidly started. Consequently, it is possible to surely prevent the vehicle from showing the excessive under-steer tendency.

Referring to another preferred mode of the present invention, the control means controls the torque generated by an engine which drives the driving wheels.

There are means for applying braking force to the driving wheel and for lowering the torque generated by the engine as means for reducing the driving torque. In case of the former, if the braking force is applied, there is an apprehension that the cornering force is reduced and the lateral grip force (antiskid) of the vehicle is lowered. In case of the latter, there is no apprehension mentioned above, so that it is advantageous to turning.

These and other objects, features and advantages of the present invention will become more apparent upon a reading of the following detailed description and drawings.

BRIEF DESCRIPTION OF THE DRAWINGS

The accompanying drawings show a preferred embodiment of the present invention, in which.

DETAILED DESCRIPTION OF A PREFERRED EMBODIMENT

A preferred embodiment of the present invention will be described with reference to the drawings.

Figure 1:
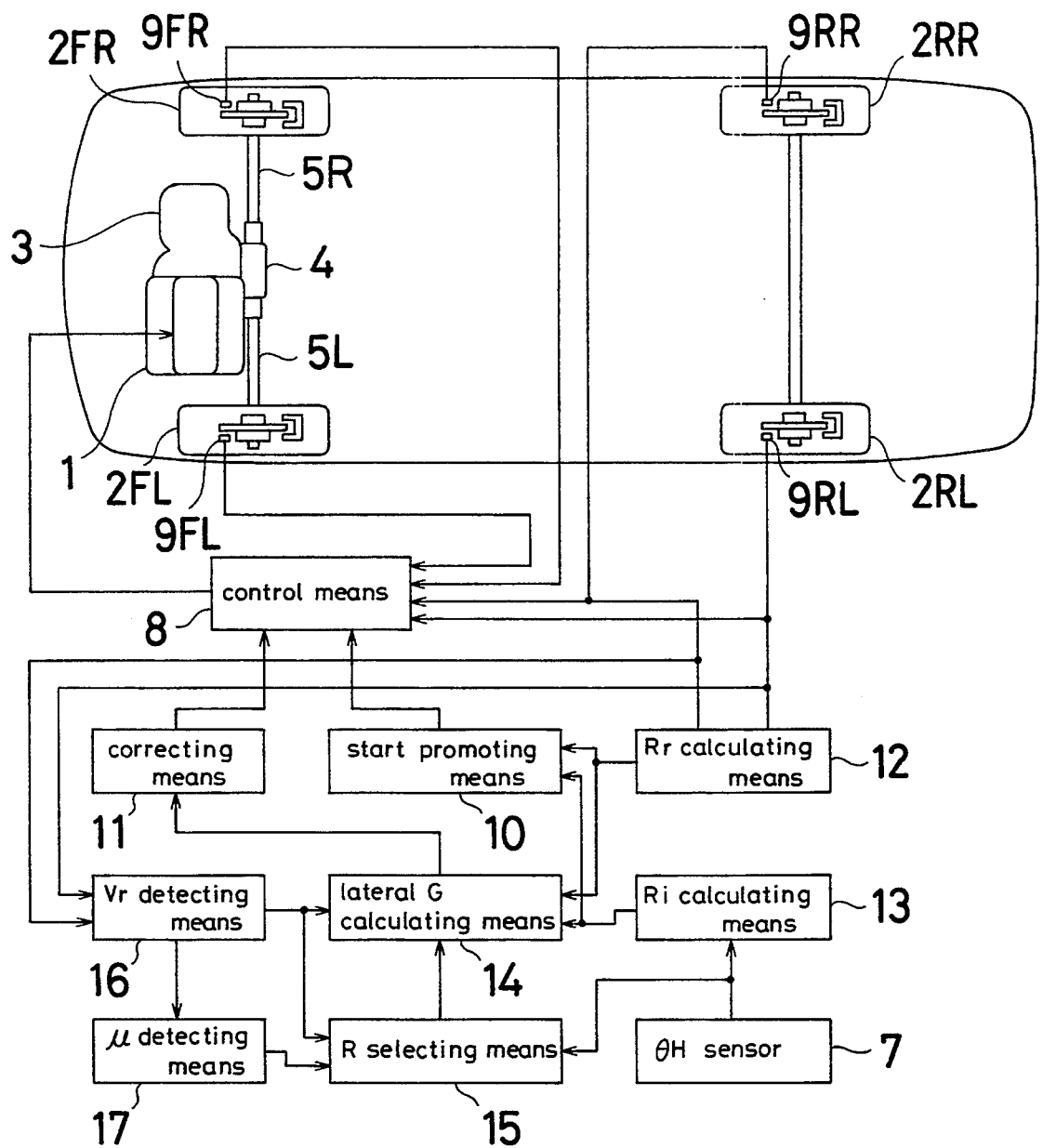
FIG. 1 is a view showing the whole structure of the traction controller of a vehicle.

FIG. 1 shows the whole structure according to the embodiment.

A vehicle comprises right and left front wheels 2FR and 2FL as driving wheels, and right and left rear wheels 2RR and 2RL as driven wheels. More specifically, a V6-cylindered engine 1 is mounted on the front portion of a body. The torque generated by the engine 1 passes through an automatic gear 3 and a differential gear 4, and is then transmitted to the right and left front wheels 2FR and 2FL through right and left driving shafts 5R and 5L respectively.

The vehicle comprises control means 8, start promoting means 10 and correcting means 11. The control means 8 serves to control the driving of the driving wheels 2FL and 2FR such that the spin quantities of the driving wheels 2FL and 2FR from a road surface become target ones when they exceed predetermined thresholds. The start promoting means 10 causes the control means 8 to early start control when the understeer tendency of the vehicle is marked. The correcting means 11 serves to correct the threshold and target value according to the lateral acceleration of the vehicle.

The control means 8 receives signals from a brake sensor for detecting that the wheels 2FL, 2FR, 2RL and 2RR are braked, a steering angle sensor for detecting the handle steering angle of the vehicle, wheel speed sensors 9FL, 9FR, 9RL and 9RR for detecting the speeds of the wheels 2FL, 2FR, 2RL and 2RR, an engine speed sensor for detecting an engine speed, and the like. Then, the control means 8 performs signal processing so as to output to the engine 1 an ignition timing control signal and a fuel injection limiting signal for reducing the output torque of the engine 1.

For the start promoting means 10 and correcting means 11, there are provided Rr calculating means 12 for calculating the actual turning radius Rr of the vehicle, and Ri calculating means 13 for calculating a steering angle corresponding turning radius Ri. For the correcting means 11, there are provided lateral acceleration calculating means 14 for calculating the lateral acceleration G of the vehicle, and turning radius selecting means 15 for selecting a turning radius to be used for lateral acceleration calculation from the actual turning radius Rr and the steering angle corresponding turning radius Ri.

The start promoting means 10, correcting means 11 and control means 8 will be described sequentially.

<Start promoting means 10>

The start promoting means 10 determines whether spin control is to be started based on the actual turning radius Rr obtained by the Rr calculating means 12 and the steering angle corresponding turning radius Ri obtained by the Ri calculating means 13, and then outputs a spin control starting signal to the control means 8.

The Rr calculating means 12 serves to calculate the actual turning radius Rr with the following formula (1) based on the wheel speeds VRL and VRR of the driven wheels 2RL and 2RR detected by the wheel speed sensors 9RL and 9RR.

Formula (1)

$$Rr = Min\ (VRL,\ VRR) \times T \div |VRL - VRR| + \tfrac{1}{2} \times T$$

where Min (VRL, VRR) is either VRL or VRR which is smaller, |VRL−VRR| is the absolute value of the difference between VRL and VRR, and T is the tread of the vehicle (for example, 1.7 m).

The Ri calculating means 13 serves to obtain the steering angle corresponding turning radius Ri (almost corresponding to a neutral steering turning radius) by linear interpolation in accordance with the following Ri table, which is set by unitarily corresponding to the steering angle in advance, based on the absolute value of a steering angle $\theta$ H detected by a steering angle sensor 7.

| | Ri table | | |
|---|---|---|---|
| $|\theta H|$ | Ri (m) | $|\theta H|$ | Ri (m) |
| 0° | 85 | 255° | 10 |
| 30° | 85 | 340° | 8 |
| 85° | 30 | 425° | 6 |
| 170° | 15 | 510° | 5 |

The start promoting means 10 compares the actual turning radius Rr obtained by the Rr calculating means 12 with the turning radius Ri obtained by the steering angle corresponding turning radius calculating means 13, and outputs a spin control starting signal (spin flag SFL=1) to the control means 8 when the condition shown in the following formula (2) is met (when the actual turning radius Rr is greater than the steering angle corresponding turning radius Ri).
Formula (2)

Actual turning radius Rr > Steering angle corresponding turning radius Ri

Figure 2:
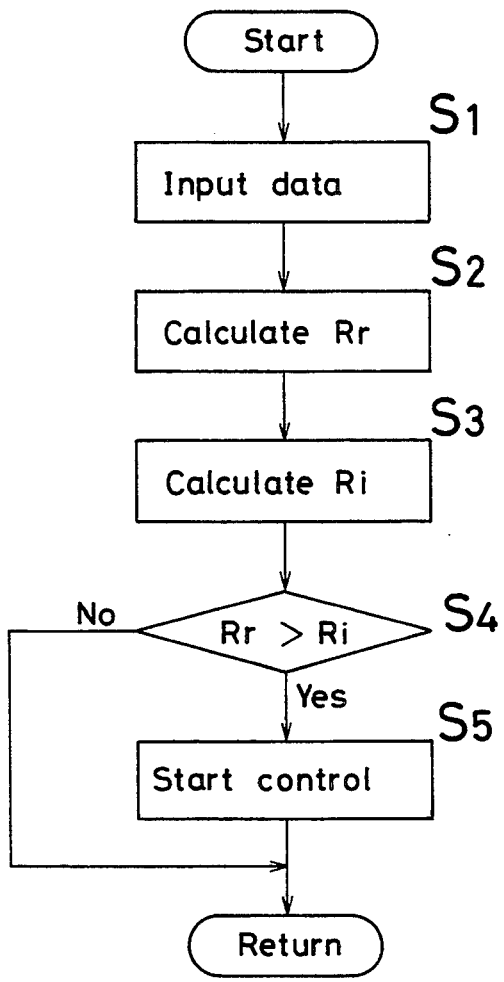
FIG. 2 is a flow chart of the early start of control.

FIG. 2 shows control flow in the start promoting means 10.

More specifically, data on the driven wheel speeds VRL and VRR and the steering angle $\theta$ H are inputted to obtain the actual turning radius Rr and steering angle corresponding turning radius Ri during running (Steps S1 to S3). When the actual turning radius Rr is greater than the steering angle corresponding turning radius Ri, the spin control starting signal is outputted (Steps S4 and S5).

<Correcting means 11>

Lateral acceleration calculation

The lateral acceleration calculating means 14 for the correcting means 11 serves to calculate the lateral acceleration G of the vehicle based on a vehicle speed Vr and the turning radius R of the vehicle with the following formula (3).
Formula (3)

$$G = Vr^2 \times (1/R) \times (1/127)$$

Vehicle speed detecting means 16 serves to detect as the vehicle speed Vr either the wheel speed VRL or VRR of the driven wheel, which is higher, detected by the wheel speed sensors 9RL and 9RR. The turning radius R is selected from the actual turning radius Rr and the steering angle corresponding turning radius Ri by the turning radius selecting means 15. 1/127 is a constant.

In the Ri table, when $|\theta H| \leq 30°$, Ri=85 m. In this case, it is desired that the steering angle corresponding turning radius Ri is set differently, i.e., Ri=85 m when $|\theta H| = 30°$, and Ri=150 m when $|\theta H| = 15°$.

Lateral acceleration corresponding correction

The correcting means 11 serves to calculate a correction factor k for correcting a spin judging threshold and a control target value such that they are decreased as the lateral acceleration G calculated by the lateral acceleration calculating means 14 is increased, and to output the correction factor k to spin judging threshold setting means and control target value setting means.

In that case, the correcting means 11 has the following correction factor table in which the lateral acceleration of the vehicle is preliminarily set as a parameter, and calculates the correction factor based on the table.

| Correction factor table | | | |
|---|---|---|---|
| Lateral acceleration | Correction factor | Lateral acceleration | Correction factor |
| 0 | 1 | 0.7 | 0.6 |
| 0.1 | 0.9 | 0.9 | 0.5 |
| 0.3 | 0.8 | 1 | 0 |
| 0.5 | 0.7 | | |

Turning radius selection

The turning radius selecting means 15 serves to judge whether a tendency for the vehicle to deviate from a running line having the steering angle corresponding turning radius Ri is marked at the time of turning based on the road surface and the driving conditions of the vehicle, and to select as the turning radius R for lateral acceleration calculation by the lateral acceleration calculating means 14 the steering angle corresponding turning radius Ri when the tendency is marked, and the actual turning radius Rr when the tendency is not marked.

More specifically, the judgment is carried out based on the steering angle $\theta$ H detected by the steering angle sensor 7, the vehicle speed Vr detected by the vehicle speed detecting means 16 and a friction coefficient $\mu$ detected by road friction coefficient detecting means 17. If the absolute value of the steering angle $\theta$ H is equal to or greater than a predetermined value $\theta$ Ho, the vehicle speed Vr is equal to or greater than a predetermined value Vro and the friction coefficient $\mu$ is equal to or smaller than a predetermined value $\mu$o, the steering angle corresponding turning radius Ri is selected. If one of the above-mentioned conditions is not met, the actual turning radius Rr is selected.

Road friction coefficient $\mu$

The road friction coefficient detecting means 17 serves to calculate the road friction coefficient $\mu$ based on the vehicle speed Vr and its acceleration VG.

A timer A (100 msec count) and a timer B (500 msec count) are used to calculate the vehicle acceleration VG. The vehicle acceleration VG is obtained with the following formula (4) based on the change of the vehicle speed Vr for 100 msec every 100 msec (in case of the present embodiment, either of the wheel speeds, which is higher, of the driven rear wheels 2RL and 2RR, unit; km/h) until 500 msec passes after the start of traction control (the vehicle acceleration is not fully developed). After 500 msec (the vehicle acceleration is fully developed), the vehicle acceleration VG is obtained with the following formula (5) based on the change of the vehicle speed Vr for 500 msec every 100 msec.
Formula (4)

$$VG = Gk1 \times \{Vr(k) - Vr(k-100)\}$$

Formula (5)

$$VG = Gk2 \times \{Vr(k) - Vr(k-500)\}$$

where Gk1 and Gk2 are coefficients, Vr(k) is a vehicle speed at this time, Vr(k−100) is the vehicle speed of 100 msec before, and Vr(k−500) is the vehicle speed of 500 msec before.

The road friction coefficient $\mu$ is obtained by three-dimensional interpolation based on the vehicle acceleration VG and the vehicle speed Vr in accordance with the following $\mu$ table.

| μ table | | | | | | | | | |
|---|---|---|---|---|---|---|---|---|---|
| | VG | | | | | | | | |
| | 0.00 | 0.05 | 0.10 | 0.15 | 0.20 | 0.25 | 0.30 | 0.35 | 0.40 |
| Vr (km) | | | | | | | | | |
| 000 | 1.0 | 1.0 | 2.0 | 2.0 | 3.0 | 3.0 | 4.0 | 4.0 | 5.0 |
| 020 | 1.0 | 1.0 | 2.0 | 2.0 | 3.0 | 4.0 | 4.0 | 5.0 | 5.0 |
| 040 | 1.0 | 1.0 | 2.0 | 3.0 | 3.0 | 4.0 | 4.0 | 5.0 | 5.0 |
| 060 | 1.0 | 1.0 | 2.0 | 3.0 | 4.0 | 4.0 | 5.0 | 5.0 | 5.0 |
| 080 | 1.0 | 1.0 | 2.0 | 3.0 | 4.0 | 5.0 | 5.0 | 5.0 | 5.0 |
| 100 | 1.0 | 1.0 | 2.0 | 4.0 | 4.0 | 5.0 | 5.0 | 5.0 | 5.0 |
| 120 | 1.0 | 2.0 | 3.0 | 4.0 | 5.0 | 5.0 | 5.0 | 5.0 | 5.0 |
| 140 | 1.0 | 2.0 | 3.0 | 5.0 | 5.0 | 5.0 | 5.0 | 5.0 | 5.0 |

Figure 3:
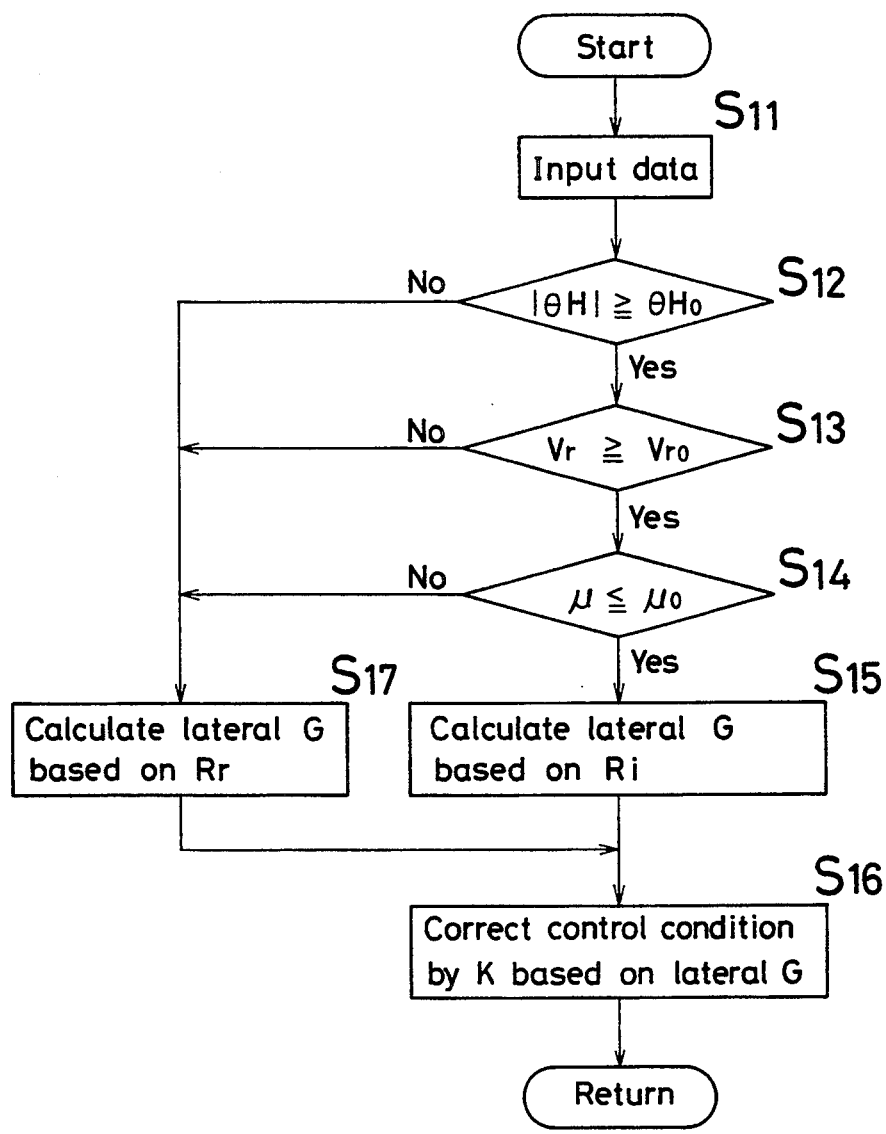
FIG. 3 is a flow chart of the correction of control conditions.

FIG. 3 shows the flow of the lateral acceleration corresponding correction control.

More specifically, data on the driven wheel speeds VRL and VRR and the steering angle $\theta$H are inputted. If the absolute value of the steering angle $\theta$H is equal to or greater than a predetermined value $\theta$Ho, the vehicle speed Vr is equal to or greater than a predetermined value Vro and the friction coefficient $\mu$ is equal to or smaller than a predetermined value $\mu$o, the lateral acceleration G is calculated based on the steering angle corresponding turning radius Ri. The correction factor k is calculated based on the lateral acceleration G so as to correct the spin judging threshold and the control target value (Steps S11 to S18). If one of the above-mentioned conditions is not met, the lateral acceleration G is calculated based on the actual turning radius Rr (Step S17). The correction factor k is calculated based on the lateral acceleration G so as to correct the spin judging threshold and the control target value.

<Control means 8>

Figure 4:
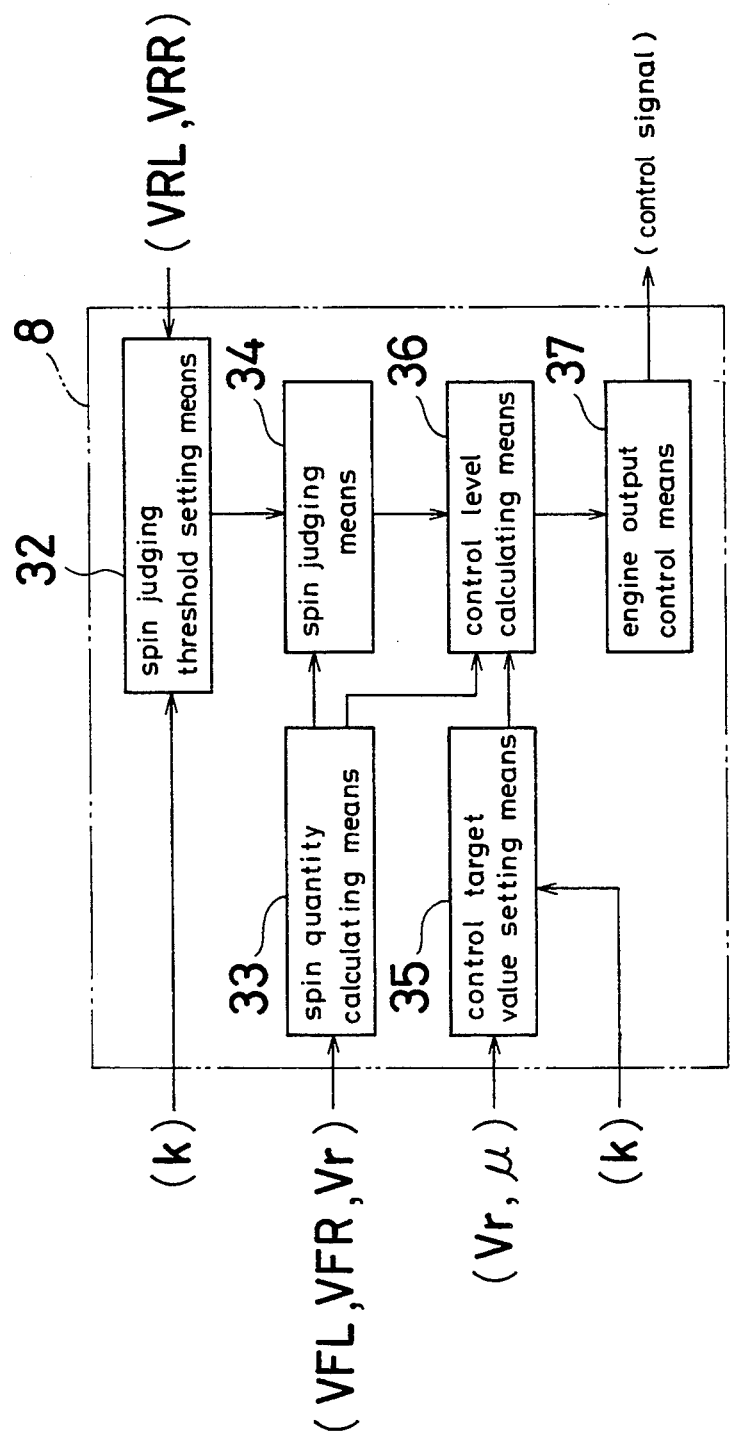
FIG. 4 is a view showing the structure of control means.

The control means 8 includes an input interface for receiving signals from the sensors, a microcomputer having a CPU, a ROM and a RAM, an output interface, and a driving circuit for driving an igniter and a fuel injection system. The ROM is provided with control programs, various maps or tables necessary for the traction control. The RAM is provided with various memories necessary to execute the control. As shown in FIG. 4, the control means 8 includes spin judging threshold setting means 32, spin quantity calculating means 33, spin judging means 34, control target value setting means 35, control level calculating means 36 and engine output control means 37.

[Spin judging threshold setting]

The spin judging threshold serves to judge whether the traction control is needed. The spin judging threshold setting means 32 calculates a basic threshold by three-dimensional interpolation based on the vehicle speed Vr and the road friction coefficient $\mu$ in accordance with the following threshold tables 1 and 2, and sets the threshold based on the correction factor k obtained by the correcting means 11 with the following formula (6).

Formula (6)

$$\text{Threshold} = \text{basic threshold} \times k$$

| Threshold table 1 (for start) | | | | | | |
|---|---|---|---|---|---|---|
| | Vr | | | | | |
| | 0 | 10 | 20 | 40 | 60 | 80 |
| μ | | | | | | |
| 1 | +10 | +9 | +7 | +6 | +5 | +4 |
| 2 | +11 | +10 | +9 | +8 | +7 | +6 |
| 3 | +12 | +11 | +10 | +9 | +8 | +7 |
| 4 | +13 | +12 | +11 | +10 | +9 | +8 |
| 5 | +14 | +13 | +12 | +11 | +10 | +9 |

| Threshold table 2 (for continuation) | | | | | | |
|---|---|---|---|---|---|---|
| | Vr | | | | | |
| | 0 | 10 | 20 | 40 | 60 | 80 |
| μ | | | | | | |
| 1 | +3 | +3 | +2 | +2 | +1 | +1 |
| 2 | +4 | +4 | +3 | +3 | +2 | +2 |
| 3 | +5 | +5 | +4 | +4 | +3 | +3 |
| 4 | +6 | +6 | +5 | +5 | +4 | +4 |
| 5 | +7 | +7 | +6 | +6 | +5 | +5 |

The threshold table 1 is used for judging whether the traction control is started. The threshold table 2 is used for judging whether the traction control is continued.

[Spin quantity calculation]

Figure 5:
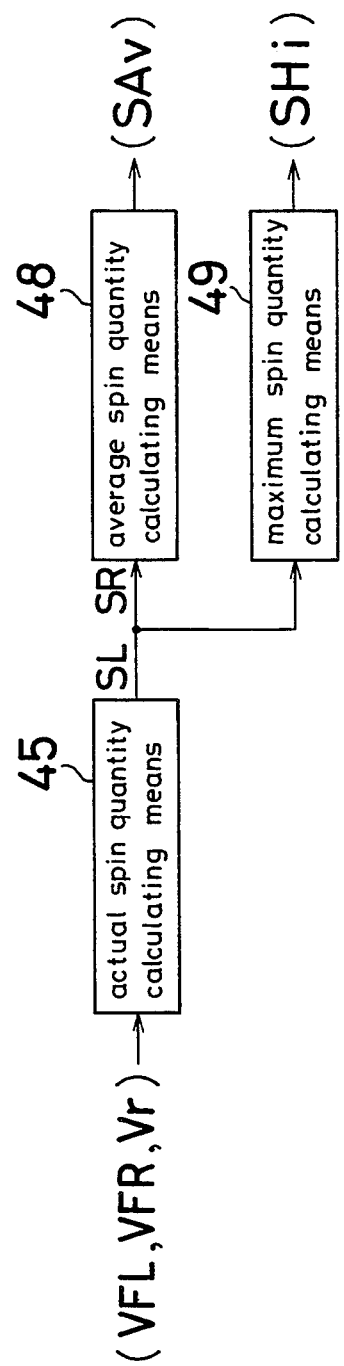
FIG. 5 is a view showing the structure of spin quantity calculating means.

As shown in FIG. 5, the spin calculating means 33 includes actual spin quantity calculating means 45, average spin quantity calculating means 48 and maximum spin quantity calculating means 49.

The actual spin quantity calculating means 45 serves to subtract the vehicle speed Vr from the wheel speeds VFR and VFL of the right and left front wheels 2FR and 2FL so as to obtain their spin quantities SR and SL. The average spin quantity calculating means 48 serves to calculate an average spin quantity SAv based on the spin quantities SL and SR. The maximum spin quantity calculating means 49 serves to obtain either the spin quantity SL or SR, which is larger, as a maximum spin quantity SHi.

[Spin judgment]

The spin judging means 34 judges that the traction control is needed based on the maximum spin quantity SHi and the spin judging threshold when the formula (7) is met, and sets the spin flag SFL to 1.

Formula (7)

$$SHi \geq \text{spin judging threshold}$$

In this case, when spin control judging means 66 judges that the control is not carried out (CFL=0), the spin judging threshold is a threshold based on the threshold table 1 (for start). When the spin control judging means 66 judges that the control is being carried out (CFL=1), the spin judging threshold is a threshold based on the threshold table 2 (for continuation).

[Control target value setting]

A control target value T is a desired one as the spin quantities of the front wheels 2FL and 2FR. The control target value setting means 35 serves to calculate a control target basic value by three-dimensional interpolation based on the vehicle speed Vr and the road friction coefficient $\mu$ in accordance with the following control target basic value table, and to set the control target value based on the correction factor k obtained by the correcting means 11 with the following formula (8).

Formula (8)

$$T = \text{control target basic value} \times k$$

Control target basic value table

| | Vr | | | | | |
|---|---|---|---|---|---|---|
| | 0 | 10 | 20 | 40 | 60 | 80 |
| μ | | | | | | |
| 1 | +5.0 | +4.0 | +3.0 | +3.0 | +3.0 | +3.0 |
| 2 | +5.0 | +4.0 | +4.0 | +3.0 | +3.0 | +3.0 |
| 3 | +5.0 | +4.0 | +4.0 | +4.0 | +3.0 | +3.0 |
| 4 | +6.0 | +5.0 | +5.0 | +4.0 | +4.0 | +4.0 |
| 5 | +6.0 | +5.0 | +5.0 | +5.0 | +4.0 | +4.0 |

[Control level calculation]

Figure 6:
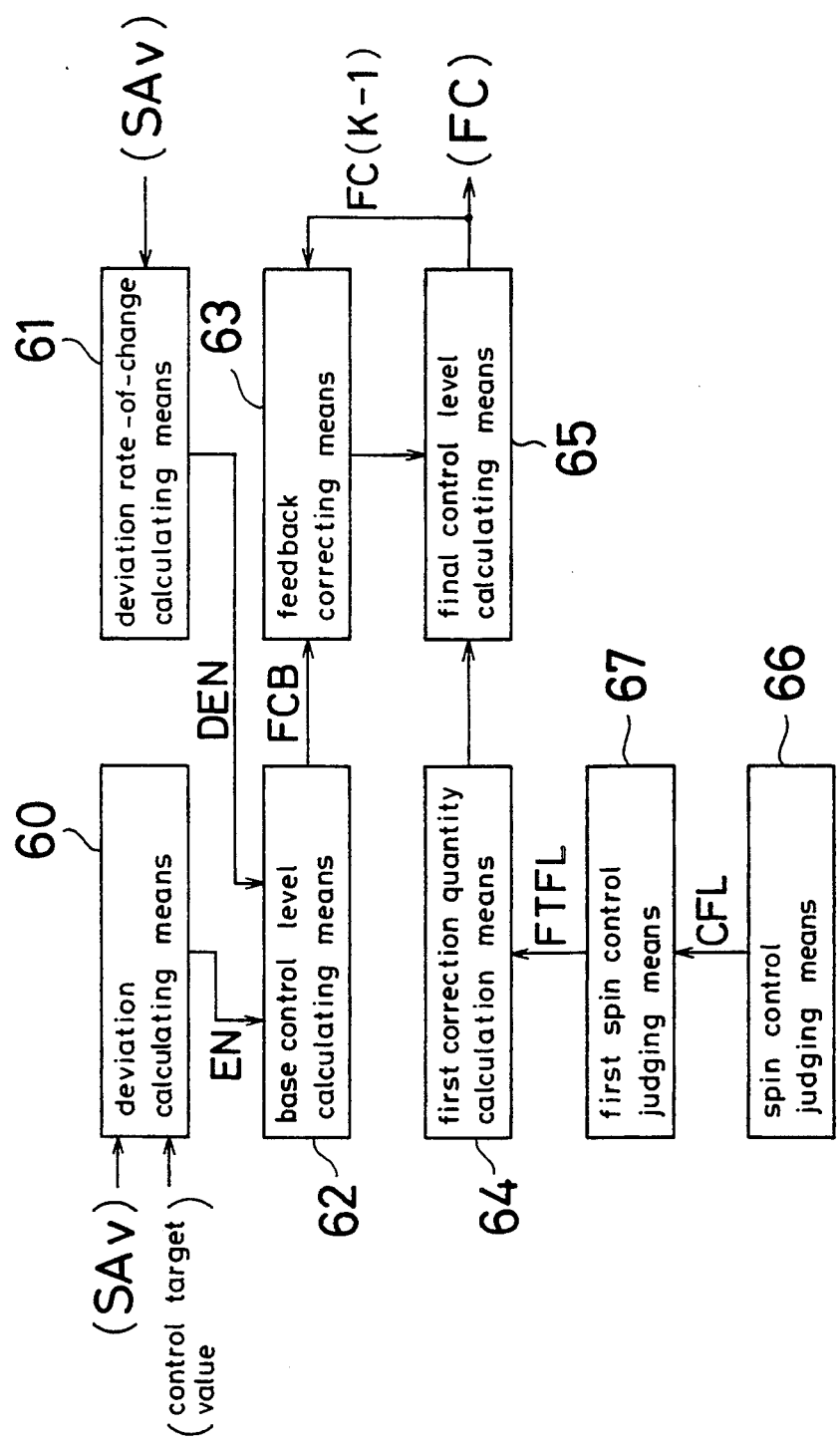
FIG. 6 is a view showing the structure of control level calculating means.

A control level FC is determined based on the deviation EN of the average spin quantity SAv from the control target quantity T and its rate of change DEN. The control level FC is subjected to the feedback correction of a last value FC(k−1) and first value correction. Consequently, the control level FC is set within the range of 0 to 15. For this calculation, there are provided deviation calculating means 60, deviation rate-of-change calculating means 61, basic control level calculating means 62, feedback correcting means 63, first correction quantity calculating means 84 and final control level calculating means 65 as shown in FIG. 6.

The deviation calculating means 60 serves to subtract the control target value T from the average spin quantity SAv so as to obtain the deviation EN.

The deviation rate-of-change calculating means 61 serves to calculate a rate of change of the average spin quantity DSAv as the rate of change of the deviation DEN with the following formula (9).

Formula (9)

$$DSAv = SAv(k) - SAv(k-1)$$

The basic control level calculating means 62 serves to calculate a basic control level FCB based on the deviation EN and its rate of change DEN in accordance with the following basic control level table.

Basic control level table

| | DEN (g) | | | | |
|---|---|---|---|---|---|
| | −2 | −0.5 | | +0.5 | +2 |
| EN (km/h) | | | | | |
| −10 | −3 | −2 | −1 | −1 | 0 | +1 | +1 |
| −5 | −3 | −1 | −1 | 0 | 0 | +1 | +1 |
| −3 | −2 | −1 | −1 | 0 | 0 | +1 | +1 |
| −0.5 | −2 | −1 | 0 | 0 | +1 | +1 | +1 |
| +0.5 | −2 | −1 | 0 | 0 | +1 | +1 | +2 |
| +3 | −1 | −1 | 0 | 0 | +1 | +1 | +2 |
| +5 | −1 | 0 | 0 | +1 | +1 | +1 | +2 |
| +10 | −1 | 0 | 0 | +1 | +1 | +1 | +3 |
| +15 | −1 | 0 | 0 | +1 | +1 | +2 | +3 |

The feedback correcting means 63 serves to add a last control level FC(k−1) to a present control level FC(k).

The first correction quantity calculating means 64 serves to forcibly increase the control level until the first spin judgment of the front wheels is eliminated after it is executed. Accordingly, there are respectively provided the spin control judging means 66 and first spin control judging means 67 shown in FIGS. 7 and 8.

Figure 7:
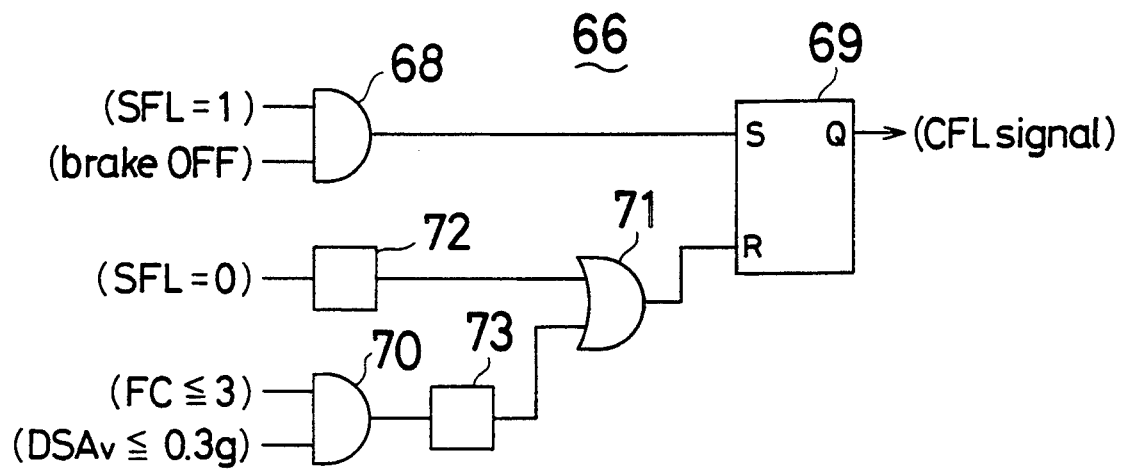
FIG. 7 is a view showing the structure of control judging means.

In FIG. 7, the reference numeral 68 denotes an AND circuit for outputting a set signal to a flip-flop 69 when the spin flag SFL is "1" and braking is not carried out, the reference numeral 70 denotes an AND circuit for outputting "1" when FC≦3 and DSAv≦0.3 g, and the reference numeral 71 denotes an OR circuit for outputting a reset signal to the flip-flop 69 when continuously receiving a spin flag SFL=0 signal through a counter 72 for 1000 msec or continuously receiving an output signal "1" from the AND circuit through a counter 73 for 500 msec. The flip-flop 69 outputs a control flag CFL=1 signal (during traction control) when receiving the set signal.

Figure 8:
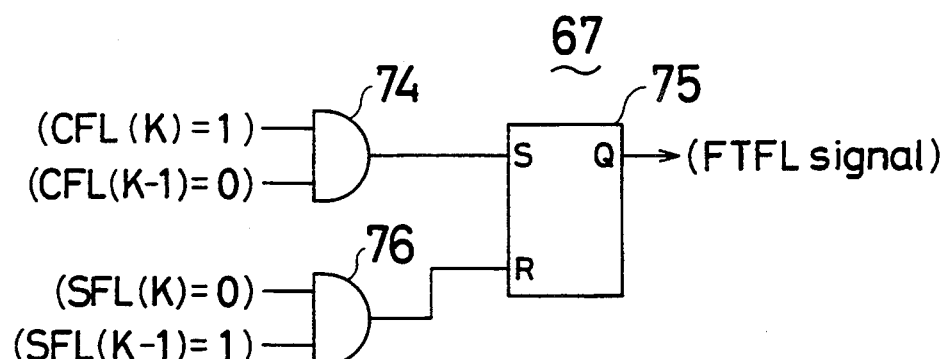
FIG. 8 is a view showing the structure of first control judging means.

In FIG. 8, the reference numeral 74 denotes an AND circuit for outputting a set signal to a flip-flop 75 when a present control flag CFL(k)=1 and a last control flag CFL(k−1)=0, and the reference numeral 76 denotes an AND circuit for outputting a reset signal to the flip-flop 75 when a present spin flag SFL(k)=0 and a last spin flag SFL(k−1)=1. The flip-flop 75 receives the set signal and then outputs a first flag FTFL=1 signal (during first control).

The first correction quantity calculating means 64 inputs the first flag FTFL signal and the rate of change of the average spin quantity DSAv, and then calculates and outputs a first correction quantity (+5) when FTFL=1 and DSAv≦0, and a first correction quantity (+2) when FTFL=1 and DSAv<0.

The final control level calculating means 65 serves to add the first correction quantity to the feedback corrected control level FC.

[Output control]

Ignition timing control

Figure 9:
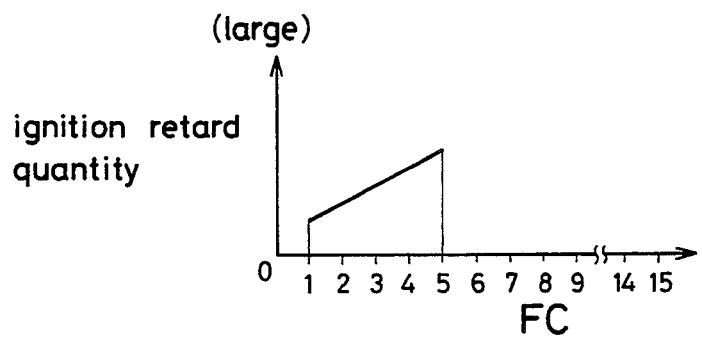
FIG. 9 is a characteristic chart showing the relationship between a control level and an ignition timing retard quantity.
Figure 10:
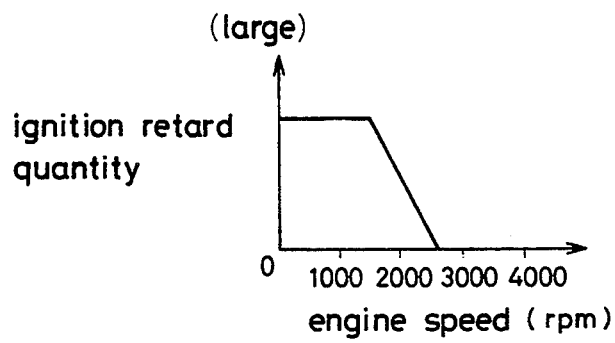
FIG. 10 is a characteristic chart showing the limitation of the ignition timing retard quantity by an engine speed.

Referring to an ignition timing, a retard quantity is determined according to the control level and is then outputted as shown in FIG. 9. In this case, the maximum retard quantity is limited in a region in which an engine speed is high as shown in FIG. 10.

Fuel injection limitation (fuel cut)

Figure 11:
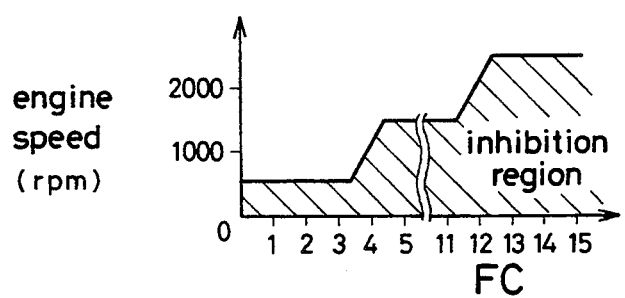
FIG. 11 is a characteristic chart showing a fuel cut limiting region by the engine speed.

Fuel injection is limited by selecting patterns 0 to 12 shown in the following fuel cut table based on the control level (i.e., by selecting a pattern having a greater value when the level is higher). In this case, a fuel cut inhibition condition is set for each control level such that the fuel cut is limited in a region in which the engine speed is low as shown in FIG. 11. "X" in the table means the fuel injection cut.

Fuel cut table

| | Fuel injection timing | | | | | | | | | | | | | Remarks |
|---|---|---|---|---|---|---|---|---|---|---|---|---|---|---|
| | 1 | 2 | 3 | 4 | 5 | 6 | 7 | 8 | 9 | 10 | 11 | 12 | | |
| pattern 0 | | | | | | | | | | | | | | All cylinders injection |

-continued

| | Fuel cut table | | | | | | | | | | | | |
|---|---|---|---|---|---|---|---|---|---|---|---|---|---|
| | Fuel injection timing | | | | | | | | | | | | |
| | 1 | 2 | 3 | 4 | 5 | 6 | 7 | 8 | 9 | 10 | 11 | 12 | Remarks |
| 1 | X | | | | | | | | | | | | One cylinder thinning |
| 2 | X | | | | | X | | | | | | | One cylinder cut |
| 3 | X | | | X | | X | | | | | | | |
| 4 | X | | | X | | X | | | X | | | | Two cylinders cut |
| 5 | X | X | | X | | X | | | X | | | | |
| 6 | X | X | | X | | | X | X | | X | | | Three cylinders (half bank) cut |
| 7 | X | X | | X | X | | X | X | | X | | | |
| 8 | X | X | | X | X | | X | X | | X | X | | Four cylinders cut |
| 9 | X | X | X | X | X | | X | X | | X | X | | |
| 10 | X | X | X | X | X | | X | X | X | X | X | | Five cylinders cut |
| 11 | X | X | X | X | X | X | X | X | X | X | X | | |
| 12 | X | X | X | X | X | X | X | X | X | X | X | X | All cylinders cut |

Figure 12:
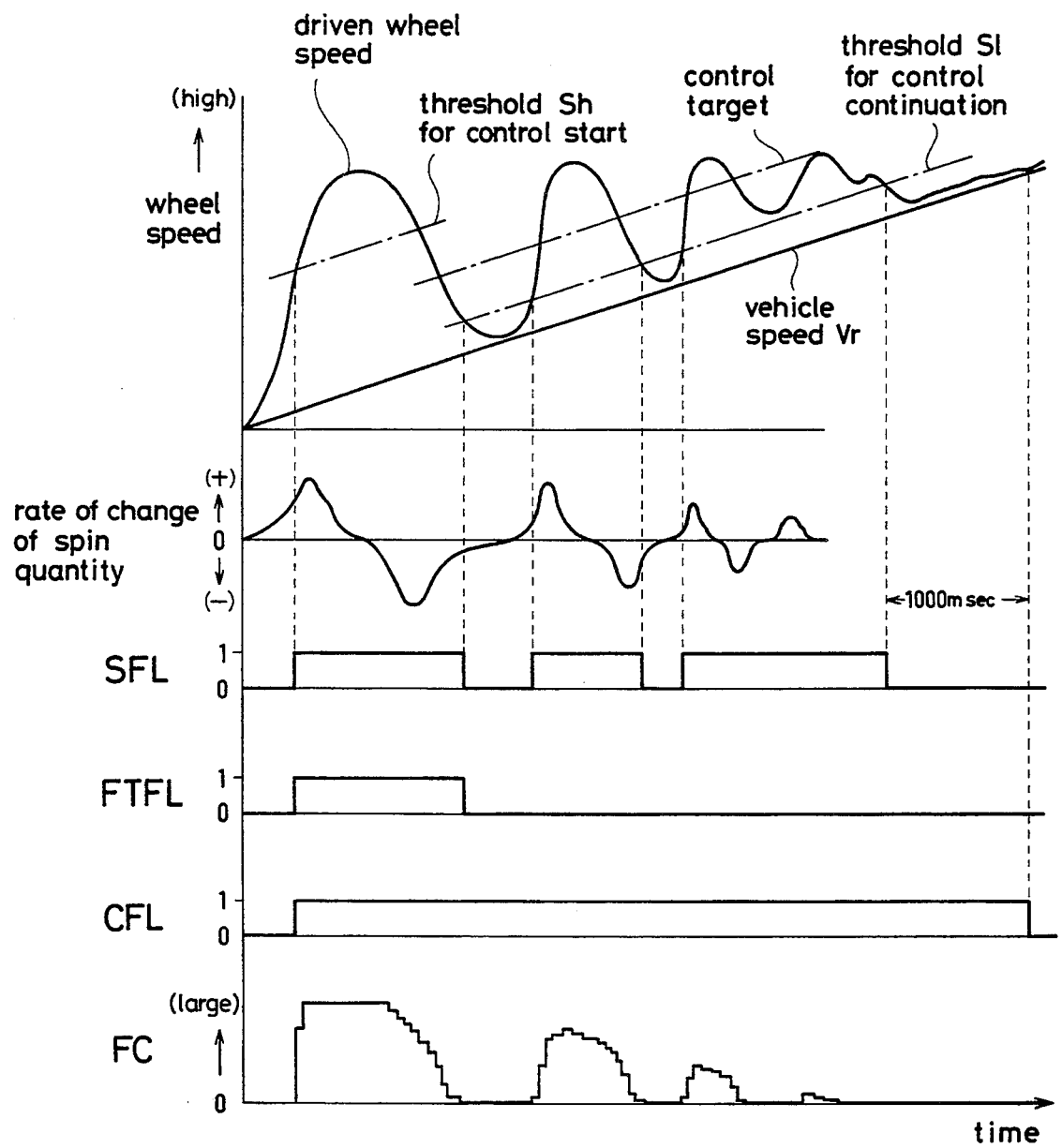
FIG. 12 is a time chart of traction control.

FIG. 12 shows the flow of the traction control.

More specifically, the basic value of a traction control start judging threshold for proceeding from a non-control state to the traction control is calculated in accordance with the basic value table for start and is set comparatively great (correspondingly to Sh in FIG. 12). Consequently, even if the driving wheel speed is increased (the maximum spin quantity SHi is made larger) by disturbance or the like, the spin flag SFL is not raised unless the threshold Sh is not exceeded. As a result, the control is not started. When the driving wheel speed exceeds the threshold Sh, the spin flag SFL is raised. When the brake is not under operation, the control flag CFL and the first flag FTFL are raised. Consequently, the traction control is started.

Even if the driving wheel speed does not exceed the threshold Sh, the spin flag SFL is raised when the actual turning radius Rr is greater than the steering angle corresponding turning radius Ri at the time of turning. Consequently, the spin control is started in similar to the foregoing.

When it is judged that the tendency for the vehicle to deviate from the running line having the steering angle corresponding turning radius Ri is marked (for example, the under-steer tendency is marked) depending on the steering angle $\theta$ H, the vehicle speed Vr and the road friction coefficient $\mu$ at the time of turning, the lateral acceleration G of the vehicle is calculated by using the steering angle corresponding turning radius Ri. In this case, the steering angle corresponding turning radius Ri is smaller than the actual turning radius Rr, so that the lateral acceleration G is increased and the correction factor k is decreased. Consequently, the control start judging threshold is made smaller.

Accordingly, even if the spin quantity itself is not so large, the traction control is early started. The driving torque of the driving wheel is early lowered, so that the excessive under-steer tendency can be prevented before it is shown.

Referring to the traction control, the average spin quantity SAv is calculated based on the front wheel speeds VFL and VFR and the vehicle speed Vr, and the control target value T is set based on the vehicle speed Vr and the road friction coefficient $\mu$. A basic control level is set based on the deviation EN of the average spin quantity SAv from the control target value T and its rate of change DEN. The first correction is carried out on the basic control level so as to obtain the control level FC. Consequently, there are carried out the ignition timing control and fuel injection limiting control corresponding to the control level FC.

The first correction is (+5) until the rate of change of the average spin quantity DSAv is first set to 0. Then, the first correction is (+2) until the first flag FTFL is set to 0. The first correction causes a control quantity to be forcibly increased. Consequently, the spin can early converge.

When the maximum spin quantity SHi of the driving wheel speed, which is higher, is equal to or smaller than a traction control continuation judging threshold, the first flag FTFL is set to 0.

When it is judged that the tendency for the vehicle to deviate from the running line having the steering angle corresponding turning radius Ri is marked at the time of turning, the correction factor k is decreased as described above. Consequently, the control target value T is made smaller. As a result, the lowering quantity of the driving torque of the driving wheel is made larger in order to reduce the spin quantity to the target value T. Thus, the under-steer tendency can be eliminated.

The basic value of the continuation judging threshold (corresponding to Sl in FIG. 12) is calculated in accordance with the basic value table for continuation, and is set comparatively small. When it is judged that the tendency for the vehicle to deviate from the running line having the steering angle corresponding turning radius Ri is marked, the correction factor k is made smaller as described above. Consequently, the continuation judging threshold is made smaller, so that the control can be continued until the spin surely converges.

When the tendency for the vehicle to deviate from the running line having the steering angle corresponding turning radius Ri is not marked at the time of turning, the lateral acceleration G is calculated by using the actual turning radius Rr. Consequently, the spin judging threshold and the control target value T can precisely be corrected correspondingly to the actual lateral acceleration.

When the driving wheel speed, which is higher, is equal to or smaller than a continuation judging threshold Sl for 1 second or less, the control flag CFL is kept raised. As the lowering quantity of the driving torque of the driving wheel is made smaller, the driving wheel speed is increased again. When the continuation judging threshold Sl is exceeded, the spin flag SFL is raised again. Consequently, the control is continued. In this case, the first flag FTFL is not raised so that the first correction is not carried on the control level FC. Accordingly, the control level FC is first set by only the basic control level based on the deviation EN and its rate of change DEN. Then, the basic control level added to the last value by feedback correction is set as the control level FC.

As described above, when the spin converges and the spin flag SFL is not kept raised for 1 second or more, the control flag CFL is set to 0. Consequently, serial traction control is completed.

While the spin judging threshold and the control target value are corrected by the same correction factor in the above-mentioned embodiment, they may be corrected by different correction factors or either of them may not be corrected. Furthermore, only the traction control starting threshold may be corrected.

The turning radius selecting means can perform judgment based on one of the vehicle speed, the steering angle and the road friction coefficient.

Although the present invention has fully been described by way of example with reference to the accompanying drawings, it is to be understood that various changes and modifications will be apparent to those skilled in the art. Therefore, unless otherwise such changes and modifications depart from the scope of the invention, they should be construed as being included therein.

What is claimed is:

1. A traction controller for a vehicle comprising:
control means for controlling a drive of driving wheels such that spin quantities of the driving wheels from a road surface become target spin quantities when said spin quantities exceed predetermined thresholds;
vehicle speed detecting means for detecting a vehicle speed;
driven wheel speed detecting means for detecting right and left driven wheel speeds;
steering angle detecting means for detecting a steering angle;
actual turning radius calculating means for calculating the actual turning radius Rr of the vehicle based on the difference between said right and left driven wheel speeds detected by said driven wheel speed detecting means;
ideal turning radius calculating means for calculating the ideal turning radius Ri of the vehicle based on the steering angle detected by said steering angle detecting means;
lateral acceleration calculating means for calculating the lateral acceleration of the vehicle based on the vehicle speed detected by said vehicle speed detecting means and one of the actual turning radius Rr calculated by said actual turning radius calculating means and the ideal turning radius Ri calculated by said ideal turning radius calculating means;
correcting means for correcting the control condition of said control means based on the lateral acceleration calculated by said lateral acceleration calculating means such that a quantity of controlling said control means for suppressing a spin of the driving wheels is increased as said lateral acceleration increases;
deviation tendency judging means for judging a tendency for the vehicle to deviate from a running line having the ideal turning radius Ri at the time of turning based on at least one of the road surface condition and the driving conditions of the vehicle; and
turning radius selecting means for selecting as a turning radius for lateral acceleration calculation by said lateral acceleration calculating means the ideal turning radius Ri calculated by said ideal turning radius calculating means when said tendency judged by said deviation judging means exceeds a predetermined threshold and the actual turning radius Rr calculated by said actual turning radius calculating means when said tendency judged by said deviation tendency judging means does not exceed said predetermined threshold.

2. A traction controller for a vehicle according to claim 1, wherein said turning radius selecting means selects the ideal turning radius Ri when the absolute value of the steering angle detected by said steering angle detecting means is equal to or greater than predetermined value, and selects the actual turning radius Rr when said absolute value is smaller than said predetermine angle value.

3. A traction controller for a vehicle according to claim 2 wherein said control condition to be corrected by said correcting means is a traction control starting threshold, said correcting means correcting said starting threshold such that traction control is started with the smaller spin quantity as the lateral acceleration calculated by said lateral acceleration calculating means is increased.

4. A traction controller for a vehicle according to claim 2 wherein said control condition to be corrected by said correcting means is a target spin quantity, said correcting means correcting said target spin quantity such that it is decreased as the lateral acceleration calculated by said lateral acceleration calculating means is increased.

5. A traction controller for a vehicle according to claim 1, wherein said turning radius selecting means selects the ideal turning radius Ri when the vehicle speed detected by said vehicle speed detecting means is equal to or greater than a predetermined speed value, and selects the actual turning radius Rr when the vehicle speed is smaller than said predetermined speed value.

6. A traction controller for a vehicle according to claim 5 wherein said control condition to be corrected by said correcting means is a traction control starting threshold, said correcting means correcting said starting threshold such that traction control is started with the smaller spin quantity as the lateral acceleration calculated by said lateral acceleration calculating means is increased.

7. A traction controller for a vehicle according to claim 5 wherein said control condition to be corrected by said correcting means is a target spin quantity, said correcting means correcting said target spin quantity such that it is decreased as the lateral acceleration calculated by said lateral acceleration calculating means is increased.

8. A traction controller for a vehicle according to claim 1, further comprising road friction coefficient $\mu$ detecting means for detecting a friction coefficient between a wheel tire and a road surface,
wherein said turning radius selecting means selects the ideal turning radius Ri when the friction coefficient $\mu$ detected by said road friction coefficient detecting means is equal to or smaller than a predetermined $\mu$ value, and selects the actual turning radius Rr when the friction coefficient is greater than said predetermined $\mu$ value.

9. A traction controller for a vehicle according to claim 1, further comprising road friction coefficient detecting means for detecting a friction coefficient μ between a wheel tire and a road surface, wherein said turning radius selecting means selects the ideal turning radius Ri when the absolute value of the steering angle detected by said steering angle detecting means is equal to or greater than a predetermined value, the vehicle speed detected by said vehicle speed detecting means is equal to or greater than a predetermined value and the friction coefficient μ detected by said road friction coefficient detecting means is equal to or smaller than a predetermined value, and selects the actual turning radius Rr when one of them is not met.

10. A traction controller for a vehicle according to claim 9, wherein said road friction coefficient detecting means calculates a road friction coefficient μ in accordance with a preset and stored μ table based on a vehicle speed Vr detected by said vehicle speed detecting means and the acceleration VG of the vehicle speed Vr, the μ table being set such that the road friction coefficient μ is increased as the vehicle speed Vr is increased and the acceleration VG is increased.

11. A traction controller for a vehicle according to claim 10, wherein said vehicle speed detecting means detects as a vehicle speed either of the right and left driven wheel speeds, which is higher, detected by said driven wheel speed detecting means.

12. A traction controller for a vehicle according to claim 1, wherein said control condition to be corrected by said correcting means is a traction control starting threshold, said correcting means correcting said starting threshold such that traction control is started with the smaller spin quantity as the lateral acceleration calculated by said lateral acceleration calculating means is increased.

13. A traction controller for a vehicle according to claim 1, wherein said control condition to be corrected by said correcting means is a target spin quantity, said correcting means correcting said target spin quantity such that it is decreased as the lateral acceleration calculated by said lateral acceleration calculating means is increased.

14. A traction controller for a vehicle according to claim 1, further comprising control start promoting means for starting the traction control with the smaller spin quantity when the actual turning radius Rr is greater than the ideal turning radius Ri.

15. A traction controller for a vehicle according to claim 14, wherein said control start promoting means forcibly starts the traction control.

16. A traction controller for a vehicle according to claim 14, wherein said control means controls the torque generated by an engine which drives the driving wheels.

17. A traction controller for a vehicle comprising:
control means for controlling a drive of driving wheels such that spin quantities of the driving wheels from a road surface become target ones when said spin quantities exceed predetermined thresholds;
vehicle speed detecting means for detecting a vehicle speed;
driven wheel speed detecting means for detecting right and left driven wheel speeds;
steering angle detecting means for detecting a steering angle;
actual turning radius calculating means for calculating the actual turning radius Rr of the vehicle based on the difference between said right and left driven wheel speeds detected by said driven wheel speed detecting means;
ideal turning radius calculating means for calculating the ideal turning radius Ri of the vehicle based on the steering angle detected by said steering angle detecting means;
lateral acceleration calculating means for calculating an actual lateral acceleration of the vehicle based on the vehicle speed detected by said vehicle speed detecting means and the actual turning radius Rr calculated by said actual turning radius calculating means and for calculating a ideal lateral acceleration of the vehicle based on the vehicle speed detected by vehicle speed detecting means;
correcting means for correcting the control condition of said control means based on one of the actual lateral acceleration and the ideal lateral acceleration calculated by said lateral acceleration calculating means such that a quantity of controlling of said control means for suppressing the spin of the driving wheels is increased as said lateral acceleration increases;
deviation tendency judging means for judging a tendency for the vehicle to deviate from a running line having the ideal turning radius Ri at the time of turning based on at least one of the road surface condition and the driving conditions of the vehicle; and
lateral acceleration selecting means for selecting as a lateral acceleration for which said correction means corrects the control condition from one of the ideal lateral acceleration calculated by said lateral acceleration means based on said ideal turning radius Ri when said tendency judged by said deviation tendency judging means exceeds a predetermined threshold and the actual lateral acceleration calculated by said lateral acceleration means based on the actual turning radius Rr when said tendency judged by said deviation tendency judging means does not exceed said predetermined threshold.

18. A traction controller for a vehicle according to claim 17, wherein said lateral acceleration selecting means selects the ideal lateral acceleration when the absolute value of the steering angle detected by said steering angle detecting means is equal to or greater than a predetermined value, and selects the actual lateral acceleration when said absolute value is smaller than said predetermined angle value.

19. A traction controller for a vehicle according to claim 18, wherein said control condition to be corrected by said correcting means is a traction control starting threshold, said correcting means correcting said starting threshold such that traction control is started with the smaller spin quantity as the lateral acceleration selected by said lateral acceleration selecting means is increased.

20. A traction controller for a vehicle according claim 18, wherein said control condition to be corrected by said correcting means is a target spin quantity, said correcting means correcting said target spin quantity such that it is decreased as the lateral acceleration selected by said lateral acceleration selecting means is increased.

21. A traction controller for a vehicle according to claim 17, wherein said lateral acceleration selecting means selects the ideal lateral acceleration when the vehicle speed detected by said vehicle speed detecting means is equal to or greater than predetermined value, and selects the actual lateral acceleration when the vehicle speed is smaller than said predetermined speed value.

22. A traction controller for a vehicle according claim 21, wherein said control condition to be corrected by said correcting means is a traction control starting threshold, said correcting means correcting said starting threshold such that traction control is started with the smaller spin quantity as the lateral acceleration selected by said lateral acceleration selecting means is increased.

23. A traction controller for a vehicle according to claim 21, wherein said control condition to be corrected by said correcting means is a target spin quantity, said correcting means correcting said target spin quantity such that it is decreased as the lateral acceleration selected by said lateral acceleration selecting means is increased.

24. A traction controller for a vehicle according to claim 17, wherein said control condition to be corrected by said correcting means is a traction control starting threshold, said correcting means correcting said starting threshold such that traction control is started with the smaller spin quantity as the lateral acceleration selected by said lateral acceleration selecting means is increased.

25. A traction controller for a vehicle according to claim 17, wherein said control condition to be corrected by said correcting means is a target spin quantity, said correcting means correcting said target spin quantity such that it is decreased as the lateral acceleration selected by said lateral acceleration selecting means is increased.

* * * * *